United States Patent Office 3,575,974
Patented Apr. 20, 1971

3,575,974
7-HYDROXYLAMINO-1,3,5-TRIAZAADAMANTANE AND ITS PRODUCTION
Edward B. Hodge, % Commercial Solvents Corp., Terre Haute, Ind., and Charles D. Hurd, 2649 Lawndale Ave., Evanston, Ill. 47531
No Drawing. Filed Nov. 12, 1968, Ser. No. 775,105
Int. Cl. C07d 57/20
U.S. Cl. 260—248                            3 Claims

ABSTRACT OF THE DISCLOSURE

7 - hydroxylamino-1,3,5-triazaadamantane and process for production thereof by reacting tris(hydroxymethyl)nitromethane with ammonia to produce the nitro-adamantane derivative, and reducing same in the presence of a palladium catalyst to produce the hydroxylamino derivative. The compounds have utility as bacteriostats and fungistats.

BACKGROUND OF THE INVENTION

This invention relates to triazaadamantane derivatives and process for the preparation thereof. In a particular aspect, it relates to triazaadamantane derivatives having bacteriostatic and fungistatic properties.

The 1,3,5 - triazaadamantane structure, which is No. 3239 in "The Ring Index," A. M. Patterson, L. T. Capell and D. F. Walker, 2nd ed. (1960), American Chemical Society, has been known from the work of H. Stetter and W. Böckmann, Chem. Ber. 84, p. 834 (1951) who reported the synthesis of a 1,3,5-triazaadamantane derivative wherein X was a methyl group by reacting tris-(aminomethyl)ethane with paraformaldehyde. However no utility was known for the compound.

SUMMARY OF THE INVENTION

It is an object of this invention to provide new fungistats and bacteriostats.

It is another object of this invention to provide novel derivatives of triazaadamantane having bacteriostatic and fungistatic properties.

Another object of the invention is to provide a process for the preparation of the bacteriostats and fungistats of the invention.

Other objects will be apparent to those skilled in the art from the disclosure herein.

A method has been discovered for the production of compounds corresponding to the formula:

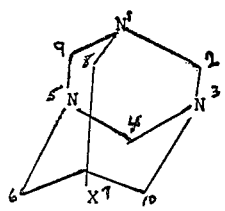

where X can be nitro (—NO₂), hydroxylamino (—NHOH) or amino (—NH₂). According to the discovery of the present invention, tris(hydroxymethyl)nitromethane is reacted with ammonia, preferably in the presence of a formaldehyde source, to produce 7-nitro-1,3,5-triazaadamantane, which in turn is partially reduced to the 7-hydroxylamino compound or completely reduced to the amino compound.

DETAILED DISCUSSION

In the process for preparing the compounds of the present invention, tris(hydroxymethyl)nitromethane is reacted with ammonia in a mole ratio of about 1 to about 4 or more, conveniently at about room temperature and for a period of time sufficient to form the nitro-triazaadamantane compound where X in the above formula is —NO₂. Preferably, but not necessarily, formaldehyde, e.g. paraformaldehyde, is added during the reaction period, preferably, but not necessarily, in incremental amounts in a ratio of 1–3 moles per mole of tris(hydroxymethyl)nitromethane. The reaction can be conveniently carried out in aqueous solution. During the reaction, the 7-nitro-1,3,5-triazaadamantane crystallizes and when the reaction is complete, the reaction mixture is chilled and the crude product is recovered by filtration. It can then be used for fungistatic purposes, or it can be converted to the hydroxylamino or amino compound. If a refined material is preferred, it can be readily prepared by recrystallization of the crude product.

For reduction, the 7-nitro-1,3,5-triazaadamantane is redissolved in hot water and is delivered to a hydrogenation unit. When the hydroxylamino compound is sought, the partial reduction is effected by any known method, e.g. by hydrogenation in the presence of a palladium catalyst on a char carrier, to produce N-(1,3,5-triaza - 1 - adamantyl)hydroxylamine in good yield. It is recovered and is particularly useful for bacteriostatic purposes.

When 1,3,5-triaza-7-adamantylamine is the derivative sought, the complete reduction of the nitro compound is effected by any known method, e.g. by hydrogenation in the presence of Raney nickel catalyst, to produce the amino compound in high yield.

The tris(hydroxymethyl)nitromethane used as a raw material for the process of this invention is commercially available, and the commercial material is suitable for use in the practice of this invention.

The ammonia used in the practice of this invention can be either gaseous, anhydrous ammonia or it can be diluted to such an extent as to be easily handled, e.g. to 10–40% by weight.

The formaldehyde used in the practice of this invention can be supplied by any suitable source including paraformaldehyde and the inhibited or uninhibited solutions of commerce, i.e. the 37% or 44% or higher concentrations. Paraformaldehyde is a preferred formaldehyde source.

The method of combatting fungi of this invention comprises application of the triazaadamantane compounds of this invention to a substratum infested with the fungi to be combatted or to a substratum to be protected from infestation with the fungi. The term substratum as used herein is intended to mean the environment or medium upon which a fungal organism grows and includes both animate and inanimate matter, such as animal and vegetable, living or dead, and the soil. The term fungi is used herein in its broad meaning and is intended to include the bacteria.

The fungistatic triazaadamantanes of this invention preferably are used in a dispersed form in a suitable extending agent. These compounds are soluble in water and are conveniently utilized in aqueous solution.

The term "dispersed" is used herein in the widest possible sense. When the fungistatic compounds of this invention are said to be dispersed, it can mean that the particles of the compounds are molecular in the form of a true solution in a suitable solvent. It can also mean that the particles are colloidal in size and distributed throughout a liquid phase in the form of particles held in suspension by wetting agents. The term also includes particles which are distributed in a semi-solid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulate form, e.g. pellets, granules, powders, or dusts. The term "dispersed" also includes mixtures which are suitable for use as aerosols including solutions, suspensions, or emulsions of the fungistatic compounds of this invention in a carrier such as the chlorofluoroalkanes which boil below room temperature at atmospheric pressure.

The term "extending agent" as used herein includes any and all of those substances in which the compounds of this invention are dispersed. It includes, therefore, the solvents of a true solution, the liquid phase of suspensions, emulsions or aerosols, the semisolid carrier of ointments and the solid phase of particulate solids, e.g. pellets, granules, dusts and powders.

The exact concentration of the fungistatic compounds of this invention employed for combatting fungal organisms can vary considerably provided the required lethal amount is supplied to the organisms or to the environment which they inhabit. When the extending agent is a liquid (e.g., as in solutions, suspensions, emulsions, or aerosols) the concentration of the fungistatic compound generally will be in the range of 0.001 to 50 percent by weight. When the extending agent is a semi-solid or solid, the concentration of the fungistatic compound generally will be in the range of 0.1 to 25 percent by weight.

Usually it is preferred to supply these compounds as a concentrate such as a spray base or a wettable powder, i.e., a particulate solid base in such form that it can be easily mixed with water or a solid extender (e.g. powdered clay or talc) or other low-cost material available at the point of use. In such a concentrate, the fungistat generally will be present in a concentration of 5 to 95 percent by weight. The remainder can be any one or more of the well-known adjuvants, such as a surface active agent (e.g., a detergent, soap, or other emulsifying or wetting agent) clays, solvents, diluents, carrier media, adhesives, spreading agents, humectants, and the like.

When the fungistatic compounds of this invention are to be used in the form of aerosols, it is convenient to dissolve them in a suitable solvent and disperse the resulting solution in the aerosol propellant, i.e., dimethyl ether, propane, dichlorodifluoromethane or other chlorofluoroalkane. The lower aliphatic alcohols are convenient solvents for this purpose.

The fungistatic compounds of this invention are preferably supplied to the fungal organisms or to their environment in the form of an aqueous solution. However, they can also be dispersed by suitable methods (e.g., tumbling or grinding) in solid extending agents and supplied to the fungal organism's environment in particulate form. Solid extending agents include both inorganic and organic materials. Inorganic materials include tricalcium phosphate, calcium carbonate, kaolin, bole, kieselguhr, talc, bentonite, fuller's earth, pyrophillite diatomaceous earth, calcined magnesia, volcanic ash, sulfur and the like. Organic materials include powdered cork, powdered wood, and powdered nut shells. The preferred solid extending agents are the adsorbent clays, e.g., bentonite. These mixtures can be used for fungistatic purposes in the dry form, or, by addition of water-soluble surface active agents the dry particulate solids can be rendered wettable by water so as to obtain stable aqueous dispersions or suspensions suitable for use as sprays.

For some purposes the fungistatic compounds of this invention can be advantageously dispersed in a semi-solid extending agent such as petrolatum or soap (e.g., the sodium salt of a fatty acid) with or without the aid of solubility promoters and/or surface active agents.

Useful concentrate which can be readily made into a spray for combatting fungal organisms is a solution (preferably as concentrated as possible) of one or more fungistatic compounds of this invention in an organic solvent therefor, to form a liquid concentrate. An example of such a concentrate is a solution of N-(1,3,5-triazo-1-adamantyl) hydroxylamine in ethanol.

The triazaadamantanes of this invention can also be advantageously employed in combination with other pesticides, including, for example, insecticides, nematocides, and herbicides to obtain mixtures which are effective against a wide variety of pests.

In controlling or combatting fungal organisms the fungistatic compounds of this invention are supplied to the fungal organisms or to their environment in a lethal or toxic amount. This can be done by dispersing one or more of the compounds or a composition containing it, in, on or over an environment or substratum infested with, or to be protected from, the fungal organisms. The fungistatic compound or composition containing it can be dispersed in any conventional method which permits contact between the organisms and the fungistatic agents of this invention. Conventional methods include power dusters, boom and hand sprayers, and spray dusters. For sub-surface application to the soil such dispersing can be carried out by simply mixing the fungistatic compound as is or compositions containing one or more of them with the soil or by applying a liquid solution of the compound to accomplish sub-surface penetration and impregnation therein.

The following examples further illustrate the invention, but it is not intended that they be interpreted as a limitation thereof.

EXAMPLE 1

Tris(hydroxymethyl)nitromethane, 30 g., was dissolved in 40 ml. of 28% ammonium hydroxide solution. The mixture was allowed to stand at room temperature overnight and on the following day 2.5 g. of dark crystals were filtered out. The crystals were redissolved in 50 ml. hot water, 0.5 g. char added for decolorization, the solution was filtered and cooled, and there was obtained 0.2 g. colorless crystals, M.P. >220° C., 46.51% C, 6.71% H, 30.93% N. The structure was determined to be 7-nitro-1,3,5-triazaadamantane.

A portion of the compound was redissolved in water and tested for fungistatic property using the streak plate method on a Sabourauds agar medium at pH 5.6 against *Fusarium oxysporum*. The compound was fungistatic at 500–1000 μg./ml. concentration.

EXAMPLE 2

Tris(hydroxymethyl)nitromethane, 240 g., was dissolved in 360 ml. of 28% by wt. ammonium hydroxide in a flask. The flask was stoppered, then immersed in a 40° C. water bath with stirring for 5 hours during which time the solution became very dark and some crystals separated. The flasks and contents were allowed to stand at room temperature for 3 days then filtered to give 11.4 g. of brown crystals. These crystals were redissolved in 300 ml. of hot water and an additional 3.6 g. of product obtained from a previous experiment was added. The solution was cooled and after recrystallization 7.7 g. colorless crystals were obtained. The solid sublimed without melting when heated in an open capillary and analyzed as follows (percent): C, 45.66; H, 6.69; N, 30.46. Calculated values for the proposed structure were (percent): C, 45.64; H, 6.57; N, 30.41. The infra-red and nuclear magnetic resonance spectra were consistent with the proposed structure.

EXAMPLE 3

The amino derivative of the product prepared in Example 2 was obtained by dissolving 5 g. in 200 ml. of ethanol. Raney nickel, 5 g., suspended in water was added and the nitro compound was reduced under hydrogen for 3 hours at 50 p.s.i.g. at room temperature.

The mixture was filtered, acidified with concentrated HCl resulting in a precipitate which was filtered and dried to yield 4.0 g. of product M.P. 207–211° C., chlorine content, 31.1%. The chlorine content calculated for a dihydrochloride of the expected amine is 31.2% chlorine.

A portion of the compound was converted to the free base dissolved in water and tested for fungistatic properties using the streak plate method on a Sabourauds agar medium at pH 5.6 against *Fusarium oxysporum* and *Aspergillus fumigatus*. The compound was fungistatic against both organisms at 500–1000 µg./ml.

EXAMPLE 4

The hydroxylamino derivative was prepared by dissolving 2.0 g. of the reaction product from Example 2 in 150 ml. of ethanol and 0.7 g. of 5% palladium on char catalyst was added; the mixture was reduced by hydrogenation at 50 p.s.i.g. at room temperature for 5 hours. The reaction mixture was then filtered, concentrated to 40 ml. and again filtered. The concentrate was chilled overnight at about 0–5° C. and again filtered to yield 0.19 g. of crystals, M.P. 210–213° C. (decomp.). The product analyzed as follows (percent): C, 49.62; H, 7.98; N, 32.57. Calculated values for the expected hydroxylamino compound are (percent): C, 49.39; H, 8.29; N, 32.92.

A portion of the compound was redissolved in water and tested for bacteriostatic properties using the streak plate method on a trypticase soya agar, pH 7.3. The compound was bacteriostatic against the following organisms at concentrations given.

| Microorganism: | µg./ml. |
| --- | --- |
| *Staphylococcus aureus* | 250–500 |
| *Streptococcus fecalis* | 500–750 |
| *Streptococcus hemolyticus* | 750–1000 |
| *Pasteurella pseudotuberculosis* | 250–500 |
| *Shigella dysenteriae* | 500–1000 |

EXAMPLE 5

A 100 g. portion of a 50% solution of tris-(hydroxymethyl)nitromethane (0.33 mole) was cooled in an Erlenmeyer flask while 20 g. of anhydrous gaseous ammonia (1.17 mole) was added. This solution was stirred 20 min. in a 20° C. bath and then 10.0 g. of paraformaldehyde (equivalent to 0.33 mole of formaldehyde) was added. After another 20 min. in the bath, another 10.0 g. portion of paraformaldehyde was added. The reaction mixture was stirred in the 20° C. bath for another 20 min., then transferred to a 45° C. bath where it was stirred 3 hours. It was left standing overnight, cooled, then filtered to give 10 g. of 7-nitro-1,3,5-triazaadamantane.

We claim:
1. The compound 7-hydroxylamino-1,3,5-triazaadamantane.
2. A process for the preparation of 7-hydroxylamino-1,3,5-triazaadamantane comprising the steps of reacting tris(hydroxymethyl)nitromethane in aqueous solution with ammonia in a mole ratio of about 1 to about 4 and in the presence of 0–3 moles of formaldehyde per mole of tris(hydroxymethyl)nitromethane, at a temperature of from about 20° to about 45° C. and for a period of time of about 16 hours to form said 7-nitro-1,3,5-triazaadamantane and crystallizing and filtering same, redissolving same in hot water or ethanol and reducing same by hydrogenation in the presence of 5% palladium on char catalyst thereby forming 7-hydroxylamino-1,3,5-trazaadamantane, filtering said catalyst therefrom, and recovering said 7-hydroxylamino-1,3,5-triazaadamantane by crystallization.
3. The process of claim 2 wherein the formaldehyde is supplied by paraformaldehyde added incrementally.

References Cited
UNITED STATES PATENTS
3,301,854  1/1967  Gabel _____ 260—248

JOHN M. FORD, Primary Examiner

U.S. Cl. X.R.
260—999